United States Patent
Chen et al.

(10) Patent No.: US 11,239,743 B2
(45) Date of Patent: Feb. 1, 2022

(54) SWITCHING MODE POWER SUPPLY PROVIDING AN OVER CURRENT PROTECTION WITH ANTI-SURGE FUNCTION

(71) Applicant: Chengdu Monolithic Power Systems Co., Ltd., Chengdu (CN)

(72) Inventors: Yuedong Chen, Chengdu (CN); Yiqing Jin, Hangzhou (CN); Zhiheng Hu, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 50 days.

(21) Appl. No.: 16/943,384

(22) Filed: Jul. 30, 2020

(65) Prior Publication Data

US 2021/0036506 A1 Feb. 4, 2021

(30) Foreign Application Priority Data

Aug. 1, 2019 (CN) .......................... 201910699719.1

(51) Int. Cl.
*H02M 1/32* (2007.01)
*H02M 3/156* (2006.01)
*H02M 1/00* (2006.01)

(52) U.S. Cl.
CPC ............ *H02M 1/32* (2013.01); *H02M 1/0009* (2021.05); *H02M 3/156* (2013.01)

(58) Field of Classification Search
CPC .... H02M 1/0009; H02M 1/0064; H02M 1/32; H02M 3/155–1588; H02H 3/021; H02H 3/025; H02H 3/057; H02H 3/06; H02H 3/07; H02H 3/08; H02H 3/087; H02H 3/093; H02H 3/0935; H02H 3/10; H02H 7/10; H02H 7/12; H02H 7/1203; H02H 7/1213

See application file for complete search history.

(56) References Cited

U.S. PATENT DOCUMENTS

| | | | |
|---|---|---|---|
| 9,472,943 B2 | 10/2016 | Urienza et al. | |
| 10,468,973 B2 | 11/2019 | Wu et al. | |
| 2010/0110593 A1* | 5/2010 | Kim | H02M 1/4225 361/18 |
| 2011/0096445 A1* | 4/2011 | Truong | H02M 1/32 361/18 |
| 2012/0049829 A1* | 3/2012 | Murakami | H02M 1/32 323/288 |
| 2014/0160601 A1* | 6/2014 | Ouyang | H02M 3/158 361/18 |
| 2015/0249380 A1* | 9/2015 | Hayakawa | H02M 3/33523 363/21.16 |
| 2016/0172999 A1* | 6/2016 | Fogg | H02M 3/1588 363/53 |
| 2017/0187298 A1* | 6/2017 | Lin | H02M 3/33523 |

(Continued)

*Primary Examiner* — Fred E Finch, III
(74) *Attorney, Agent, or Firm* — Perkins Coie LLP (57) ABSTRACT

A switching mode power supply preventing false triggering of an over current protection due to a surge pulse. The switching mode power supply has a switch and an inductor. An inductor current flows through the inductor. The switching mode power supply turns off the switch and meanwhile starts timing for a preset period of time when the inductor current is larger than a preset value. The switch is kept off during the preset period of time and is then turned on when the preset period of time expires.

17 Claims, 6 Drawing Sheets

(56) References Cited

U.S. PATENT DOCUMENTS

2018/0138814 A1* 5/2018 Fukumoto ............... H02M 1/08
2018/0367029 A1* 12/2018 Maruyama ............. H02M 1/36
2020/0161985 A1   5/2020 Li et al.
2021/0281163 A1* 9/2021 Sugawara ............. H02M 3/335

* cited by examiner

SWITCHING MODE POWER SUPPLY PROVIDING AN OVER CURRENT PROTECTION WITH ANTI-SURGE FUNCTION

CROSS-REFERENCE TO RELATED APPLICATIONS

This application claims the benefit of CN application No. CN201910699719.1, filed on Aug. 1, 2019, and incorporated herein by reference.

FIELD OF THE INVENTION

The present invention relates generally to electronic circuits, and more particularly but not exclusively to over current protecting circuits and over current protecting methods of switching mode power supplies (SMPS).

BACKGROUND OF THE INVENTION

A switching mode power supply usually comprises an inductor and a switch, and through a turning-on operation and a turning-off operation of the switch, the inductor is able to storage and/or release energy, and an input voltage can be converted into an output voltage as a result.

When the switching mode power supply is in operation, a large and long-time lasting current in the switching mode power supply may cause an over current event on occasions, for example, due to a short-circuit event to the inductor or the saturation of the inductor, etc. And accordingly, an over current protection is usually provided in a switching mode power supply to prevent the switching mode power supply from a damage. A common over current protecting scheme is to disable the entire switching mode power supply, in other words, to shut down the switching mode power supply.

The switching mode power supply may be in a surge test, in which a surge pulse with a large amplitude and a short duration is generated. Most of the prior-art over current protecting circuits deal with the surge pulse emerged in the surge test as the over current in an over current event and the over current protection in the switching mode power supply is thus triggered. However, the false triggering of the over current protection should be avoided in the surge test as the output voltage of the switching mode power supply drops dramatically and even to zero and the switching mode power supply thus needs to be restarted if the over current protection is triggered to shut down the entire switching mode power supply, which is undesired in many applications, such as the applications of server and computing.

A prior art technical scheme to prevent the false triggering of the over current protection is to detect whether an inductor current reaches a preset over current threshold value, if the inductor current is larger than the preset over current threshold value, the switch in the switching mode power supply is turned off and is kept off until the output voltage drops to a reference output voltage. In the next switching cycle, if the inductor current is still larger than the preset over current threshold value, the above operation is repeated. The switching mode power supply counts the consecutive switching cycles in which the above operation is performed and when the number of the consecutive switching cycles is larger than N, the switching mode power supply judges that an over current event occurs and thus provides the over current protection accordingly, for example, by shutting down the entire switching mode power supply.

One drawback of the above scheme is, for some switching mode power supplies, e.g., the switching mode power supply with critical conduction control mode, the durations of their switching cycles are not fixed, which makes it difficult to set a proper value of N. On one hand, the false triggering of the over current protection due to the surge pulse cannot be prevented if N is not large enough, on the other hand, the over current protection can be not provided efficiently if N is too large.

Thus, a switching mode power supply and its corresponding driving circuit and driving method are desired to at least address the above-mentioned issues.

SUMMARY

Embodiments of the present invention are directed to a driving circuit in a switching mode power supply, wherein the switching mode power supply comprises an inductor and a switch, and wherein an inductor current flows through the inductor, the driving circuit comprising: an over current comparison circuit configured to receive an over current threshold signal and a first current detecting signal representative of the inductor current generated during a period when the switch is on, wherein the over current comparison circuit is configured to generate an over current comparison signal to control a turning-off moment of the switch based on comparing the first current detecting signal with the over current threshold signal; a watch-dog circuit configured to receive a watch-dog triggering signal indicating the turning-off moment of the switch, wherein the watch-dog circuit is configured to generate a watch-dog signal based on the watch-dog triggering signal to trigger a turning-on operation of the switch after a preset period of time expires, and wherein the preset period of time is timed beginning from the turning-off moment of the switch; an on moment control circuit configured to receive a second current detecting signal representative of the inductor current generated during a period when the switch is off and to receive an on threshold signal, wherein the on moment control circuit is configured to generate an on signal to control a turning-on moment of the switch based on comparing the second current detecting signal with the on threshold signal, and wherein the on moment control circuit is enabled or disable by the over current comparison signal; and a switching control circuit configured to generate a switching control signal based on the over current comparison signal, the watch-dog signal and the on signal to control the turning-on moment and the turning-off moment of the switch.

Embodiments of the present invention are also directed to a driving method for driving a switching mode power supply, wherein the switching mode power supply comprises an inductor and a switch, and an inductor current flows through the inductor, the driving method comprising: turning off the switch and starting timing for a preset period of time when the inductor current is larger than a preset value; maintaining the switch off during the preset period of time; and turning on the switch after the preset period of time expires.

Embodiments of the present invention are further directed to a switching mode power supply, comprising: an inductor, wherein an inductor current flows through the inductor; a switch; and a driving circuit, comprising: an over current comparison circuit configured to receive an over current threshold signal and a first current detecting signal representative of the inductor current generated during a period when the switch is on, wherein the over current comparison circuit is configured to generate an over current comparison signal to control a turning-off moment of the switch based on comparing the first current detecting signal with the over current threshold signal; a watch-dog circuit configured to receive a watch-dog triggering signal indicating the turning-off moment of the switch, wherein the watch-dog circuit is configured to generate a watch-dog signal based on the watch-dog triggering signal to trigger a turning-on operation of the switch after a preset period of time expires, and wherein the preset period of time is timed beginning from the turning-off moment of the switch; an on moment control circuit configured to receive a second current detecting signal representative of the inductor current generated during a period when the switch is off and to receive an on threshold signal, wherein the on moment control circuit is configured to generate an on signal to control a turning-on moment of the switch based on comparing the second current detecting signal with the on threshold signal, and wherein the on moment control circuit is enabled or disable by the over current comparison signal; and a switching control circuit configured to generate a switching control signal based on the over current comparison signal, the watch-dog signal and the on signal to control the turning-on moment and the turning-off moment of the switch.

DESCRIPTION OF THE DRAWINGS

The present invention can be further understood with reference to the following detailed description and the appended drawings, wherein like elements are provided with like reference numerals.

DESCRIPTION

The present invention is now described. While it is disclosed in its preferred form, the specific embodiments of the invention as disclosed herein and illustrated in the drawings are not to be considered in a limiting sense. Rather, these embodiments are provided so that this invention will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. The following detailed description is, therefore, not to be taken in a limiting sense.

Throughout the invention, the meaning of "a," "an," and "the" may also include plural references. For example, "a peak" in the present invention may refer to one peak or a plurality of peaks, depending on the specific context.

Figure 1:
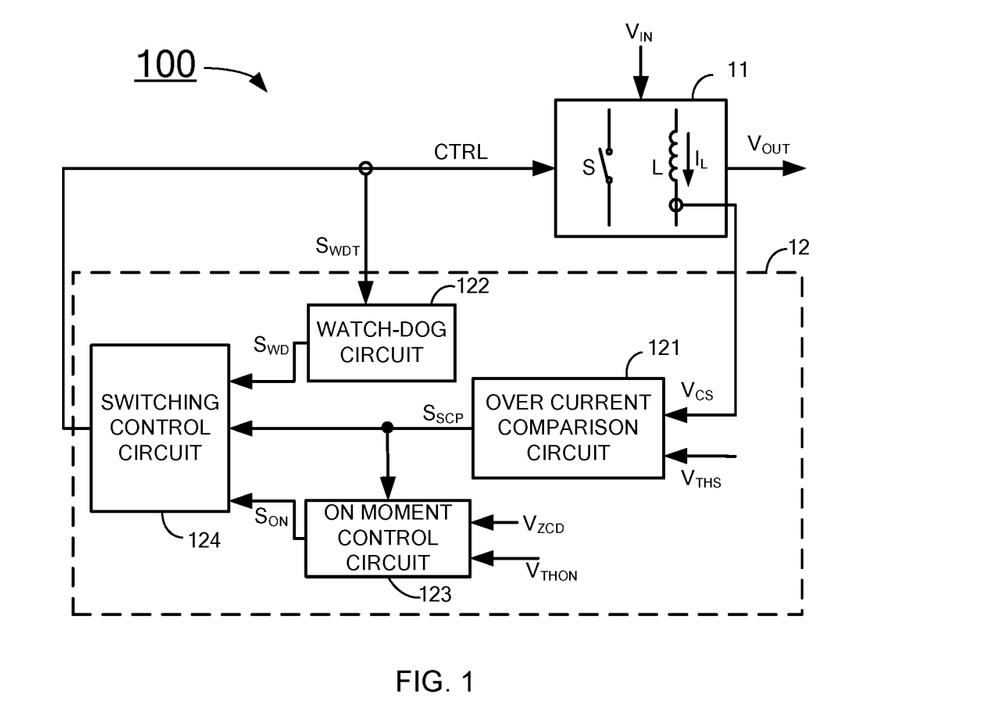
FIG. 1 schematically illustrates a switching mode power supply 100 in accordance with an embodiment of the present invention.

FIG. 1 schematically illustrates a switching mode power supply 100 in accordance with an embodiment of the present invention. As shown in FIG. 1, the switching mode power supply 100 is configured to comprise a switching circuit 11 and a driving circuit 12. The switching circuit 11 comprises a switch S and an inductor L, wherein an inductor current $I_L$ flows through the inductor L. The switching circuit 11 controls the inductor L to storage and/or release energy through a turning-on operation and a turning-off operation of the switch S so as to convert an input voltage $V_{IN}$ into an output voltage $V_{OUT}$.

Figure 2:
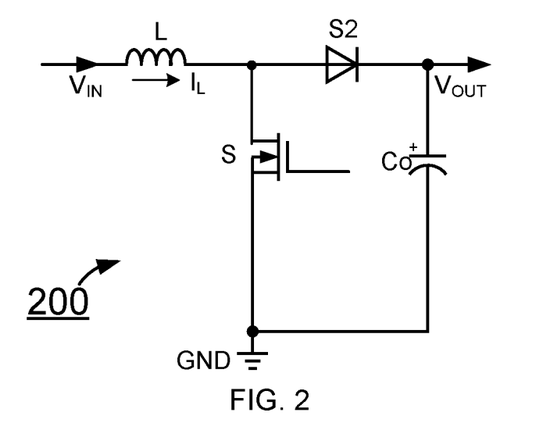
FIG. 2 schematically illustrates an exemplary configuration 200 of the switching circuit 11 of FIG. 1 in accordance with an embodiment of the present invention.

FIG. 2 schematically illustrates an exemplary configuration 200 of the switching circuit 11 of FIG. 1 in accordance with an embodiment of the present invention. As shown in FIG. 2, the switching circuit 200 is implemented with a boost switching topology. In particular, the switching circuit 200 comprises the inductor L, the switch S, a second switch S2 and an output capacitor Co. The inductor L has a first terminal and a second terminal, wherein the first terminal of the inductor L receives the input voltage $V_{IN}$. The switch S has a first terminal, a second terminal and a control terminal, wherein the first terminal of the switch S is coupled to the second terminal of the inductor L, the second terminal of the switch S is coupled to a reference ground GND, and the control terminal of the switch S receives a switching control signal so as to control the turning-on operation and the turning-off operation of the switch S (not shown). In the embodiment of FIG. 2, the switch S is implemented with a MOSFET, however, in other embodiments, the switch S can have any appropriate switching configuration. The second switch S2 has a first terminal and a second terminal, wherein the first terminal of the second switch S2 is coupled to the second terminal of the inductor L. The output capacitor Co has a first terminal and a second terminal, wherein the first terminal of the output capacitor Co is coupled to the second terminal of the second switch S2 and is configured to provide the output voltage $V_{OUT}$, and the second terminal of the second switch S2 is coupled to the reference ground GND. In the embodiment of FIG. 2, the second switch S2 is implemented with a diode, wherein an anode of the diode is configured as the first terminal of the second switch S2, and a cathode of the diode is configured as the second terminal of the second switch S2. However, persons of ordinary skill in the art will understand that, in other embodiments, the second switch S2 can have any appropriate switching configuration, such as a MOSFET. Persons of ordinary skill in the art will also understand that the boost switching topology in FIG. 2 is just for illustration, yet in another embodiment, the switching circuit 11 in FIG. 1 can use any other appropriate switching topology, such as a flyback switching topology.

The driving circuit 12 is configured to comprise an over current comparison circuit 121, a watch-dog circuit 122, an on moment control circuit 123 and a switching control circuit 124. The over current comparison circuit 121 receives an over current threshold signal $V_{THS}$ and a first current detecting signal $V_{CS}$ representative of the inductor current $I_L$, and further generates an over current comparison signal $S_{SCP}$ by comparing the over current threshold signal $V_{THS}$ with the first current detecting signal $V_{CS}$. In an embodiment, the first current detecting signal $V_{CS}$ represents the inductor current $I_L$ generated during a period when the switch S is on. In an embodiment, the first current detecting signal $V_{CS}$ is generated by a current detecting circuit. In detail, the current detecting circuit receives the inductor current $I_L$ and further generates the first current detecting signal $V_{CS}$ based on the inductor current $I_L$. In an exemplary embodiment, the current detecting circuit comprises a first detecting resistor $R_{CS1}$ and a second detecting resistor $R_{CS2}$. The first detecting resistor $R_{CS1}$ has a first terminal and a second terminal, wherein the first terminal of the first detecting resistor $R_{CS1}$ receives the inductor current $I_L$, and the second terminal of the first detecting resistor $R_{CS1}$ is coupled to a reference ground GND. The second detecting resistor $R_{CS2}$ has a first terminal and a second terminal, wherein the first terminal of the second detecting resistor $R_{CS2}$ is coupled to the first terminal of the first detecting resistor $R_{CS1}$, and the second terminal of the second detecting resistor $R_{CS2}$ is configured to provide the first current detecting signal $V_{CS}$. In another embodiment, the current detecting circuit may comprise the first detecting resistor $R_{CS1}$ but not the second detecting resistor $R_{CS2}$, and the first terminal of the first detecting resistor $R_{CS1}$ is configured to provide the first current detecting signal $V_{CS}$. Yet in another embodiment, the current detecting circuit may comprise a third detecting resistor and a fourth detecting resistor, wherein the third detecting resistor has a first terminal and a second terminal, the first terminal of the third detecting resistor receives the inductor current $I_L$, the fourth detecting resistor has a first terminal and a second terminal, the first terminal of the fourth detecting resistor is coupled to the second terminal of the third detecting resistor, the second terminal of the fourth detecting resistor is coupled to a reference ground GND. The second terminal of the third detecting resistor and the first terminal of the fourth detecting resistor is configured to provide the first current detecting signal $V_{CS}$. In an embodiment, the current detecting circuit is serially coupled to the switch S in a current loop to receive the inductor current $I_L$. Yet in another embodiment, the current detecting circuit is serially coupled to the inductor L in a current loop to receive the inductor current $I_L$. Persons of ordinary skill in the art will recognize that, the above-mentioned current detecting circuits are just for illustration, yet in another embodiment, the first current detecting signal $V_{CS}$ may be generated by a current detecting circuit with any appropriate configuration.

In an embodiment, the over current comparison circuit 121 comprises an over current comparator CMP1 having a first input terminal, a second input terminal and an output terminal, wherein the first input terminal of the over current comparator CMP1 receives the over current threshold signal $V_{THS}$, the second input terminal of the over current comparator CMP1 receives the first current detecting signal $V_{CS}$, the over current comparator CMP1 is configured to generate the over current comparison signal $S_{SCP}$ based on comparing the over current threshold signal $V_{THS}$ with the first current detecting signal $V_{CS}$. In an embodiment, the first input terminal of the over current comparator CMP1 is an inverting input terminal and the second input terminal of the over current comparator CMP1 is a non-inverting input terminal.

In an embodiment, the over current comparison signal $S_{SCP}$ transits from a non-activated state (e.g., logic low "0") into an activated state (e.g., logic high "1") when the first current detecting signal $V_{CS}$ is larger than the over current threshold signal $V_{THS}$.

The watch-dog circuit 122 receives a watch-dog triggering signal $S_{WDT}$ representative of a turning-off moment of the switch S, and generates a watch-dog signal $S_{WD}$ based on the watch-dog triggering signal $S_{WDT}$ so as to turn on the switch S after a preset period of time $T_D$ expires. The preset period of time $T_D$ is timed beginning from a moment when the switch S is turned off. In an embodiment, the watch-dog triggering signal $S_{WDT}$ can be a switching control signal CTRL controlling the turning-on operation and the turning-off operation of the switch S (the switching control signal CTRL will be elaborated soon below). In an embodiment, the watch-dog triggering signal $S_{WDT}$ transits from a non-activated state (e.g., logic "1") into an activated state (e.g., logic "0") when the switch S is turned off, consequently, the watch-dog circuit 122 starts timing and the watch-dog signal $S_{WD}$ transits from a non-activated state (e.g., logic "0") into an activated state (e.g., logic "1"). After the preset period of time $T_D$ expires, the watch-dog circuit 122 stops timing and the watch-dog signal $S_{WD}$ transits from the activated state into the non-activated state to trigger the turning-on operation of the switch S. In an embodiment, the watch-dog signal $S_{WD}$ is reset when the switch S is turned on, the watch-dog triggering signal $S_{WDT}$ transits from the activated state into the non-activated state.

In an embodiment, the switching mode power supply 100 has a normal switching cycle when the switching mode power supply 100 is in a normal operation where no transition from the non-activated state into the activated state of the over current comparison signal $S_{SCP}$ occurs, then the preset period of time $T_D$ is larger than the normal switching cycle, for example, the preset period of time $T_D$ can be approximately ten times of the normal switching cycle. Yet in another embodiment, the preset period of time $T_D$ can be appropriately set, considering the time duration when a surge pulse lasts and the time duration when an over current event lasts, so as to distinguish the surge event and the over current event to ensure the surge event ends by the end of the preset period of time $T_D$.

The on moment control circuit 123 receives an on threshold signal $V_{THON}$ and a second current detecting signal $V_{ZCD}$ representative of the inductor current $I_L$, and generates an on signal $S_{ON}$ based on comparing the second current detecting signal $V_{ZCD}$ with the on threshold signal $V_{THON}$ so as to control a turning-on moment of the switch S. In an embodiment, the second current detecting signal $V_{ZCD}$ represents the inductor current $I_L$ when the switch S is off. In an embodiment, the on moment control circuit 123 compares the second current detecting signal $V_{ZCD}$ with the on threshold signal $V_{THON}$, and when the second current detecting signal $V_{ZCD}$ is lower than the on threshold signal $V_{THON}$, the on moment control circuit 123 judges that the inductor current $I_L$ decreases to a preset value and the on signal $S_{ON}$ transits from a non-activated state (e.g., logic "0") into an activated state (e.g., logic "1") to turn on the switch S.

Figure 3:
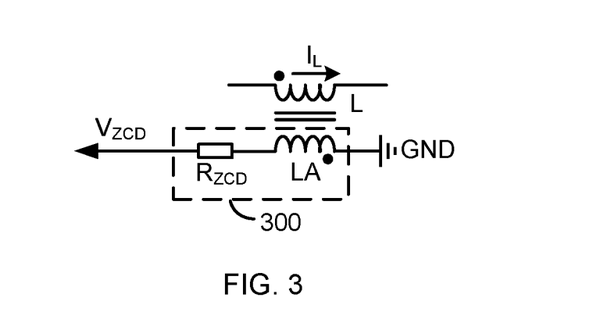
FIG. 3 schematically illustrates a zero-crossing detecting circuit 300 in accordance with an embodiment of the present invention.

In an embodiment, the second current detecting signal $V_{ZCD}$ can be generated by a zero-crossing detecting circuit 300 as shown in FIG. 3. The zero-crossing detecting circuit 300 detects the inductor current $I_L$ and generates the second current detecting signal $V_{ZCD}$ based on the inductor current $I_L$. In detail, the zero-crossing detecting circuit 300 is configured to comprise an auxiliary inductor LA and a zero-crossing detecting resistor $R_{ZCD}$. The auxiliary inductor LA is coupled to the inductor L, and the auxiliary inductor LA and the inductor L together form a transformer.

The auxiliary inductor LA has a first terminal and a second terminal, wherein the first terminal is coupled to a reference ground GND. The zero-crossing detecting resistor $R_{ZCD}$ has a first terminal and a second terminal, wherein the first terminal of the zero-crossing detecting resistor $R_{ZCD}$ is coupled to the second terminal of the auxiliary inductor LA, the second terminal of the zero-crossing detecting resistor $R_{ZCD}$ is configured to provide the second current detecting signal $V_{ZCD}$. Persons of ordinary skill in the art will recognize that, the zero-crossing detecting circuit 300 in FIG. 3 is just for illustration, in another embodiment, the second current detecting signal $V_{ZCD}$ can be generated by any appropriate configurations.

In an embodiment, the on moment control circuit 123 comprises an on comparator having a first input terminal, a second input terminal, and an output terminal, wherein the first input terminal of the on comparator receives the on threshold signal $V_{THON}$, the second input terminal of the on comparator receives the second current detecting signal $V_{ZCD}$, the on comparator generates the on signal $S_{ON}$ based on comparing the on threshold signal $V_{THON}$ with the second current detecting signal $V_{ZCD}$. In an embodiment, the first input terminal of the on comparator is a non-inverting input terminal and the second input terminal of the on comparator is an inverting input terminal.

As shown in FIG. 1, the on moment control circuit 123 is enabled or disabled by the over current comparison signal $S_{SCP}$. In detail, when the over current comparison signal $S_{SCP}$ is in the activated state, the on moment control circuit 123 is disabled, in other words, the on moment control circuit 123 stops the control of the turning-on operation of the switch S; when the over current comparison signal $S_{SCP}$ is in the non-activated state, the on moment control circuit 123 is enabled and controls the turning-on operation of the switch S based on the second current detecting signal $V_{ZCD}$ and the over current comparison signal $S_{SCP}$. Persons of ordinary skill in the art will understand that, there may be a variety of ways to enable and/or disable the on moment control circuit 123 by the over current comparison signal $S_{SCP}$, for example, one way is to shield the on signal $S_{ON}$ generated by the on moment control circuit 123, as will be elaborated soon in the description of FIG. 4 below. For another example, another way is to stop the operation of the on moment control circuit 123 so that the on signal $S_{ON}$ maintains in the non-activated state.

The switching control circuit 124 is coupled to the over current comparison circuit 121, the watch-dog circuit 122 and the on moment control circuit 123 and generates a switching control signal CTRL based on the over current comparison signal $S_{SCP}$, the watch-dog signal $S_{WD}$ and the on signal $S_{ON}$ to control the turning-on operation and the turning-off operation of the switch S. In detail, the switching control circuit 124 operates to turn off the switch S based on the over current comparison signal $S_{SCP}$ and to turn on the switch S based on the watch-dog signal $S_{WD}$ and the on signal $S_{ON}$. More particularly, when the over current comparison signal $S_{SCP}$ transits from the non-activated state into the activated state, the switching control signal CTRL transits from the activated state into the non-activated state to turn off the switch S, when the on signal $S_{ON}$ transits from the non-activated state into the activated state, the switching control signal CTRL transits from the non-activated state into the activated state to turn on the switch S; when the watch-dog signal $S_{WD}$ transits from the activated state into the non-activated state, the switching control signal CTRL transits from the non-activated state into the activated state to turn on the switch S.

Figure 4:
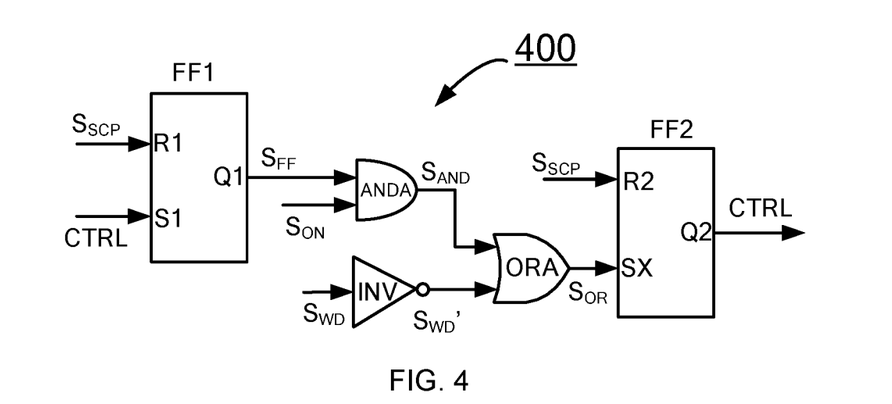
FIG. 4 schematically illustrates a circuit configuration 400 of the switching control circuit 124 in FIG. 1 in accordance with an embodiment of the present invention.

FIG. 4 schematically illustrates a circuit configuration 400 of the switching control circuit 124 in FIG. 1 in accordance with an embodiment of the present invention. As shown in FIG. 4, the switching control circuit 400 respectively receives the over current comparison signal $S_{SCP}$, the watch-dog signal $S_{WD}$ and the on signal $S_{ON}$ and generates the switching control signal CTRL based on the over current comparison signal $S_{SCP}$, the watch-dog signal $S_{WD}$ and the on signal $S_{ON}$ to control the turning-on operation and the turning-off operation of the switch S. In detail, the switching control circuit 400 operates to turn off the switch S based on the over current comparison signal $S_{SCP}$ and to turn on the switch S based on the watch-dog signal $S_{WD}$ and the on signal $S_{ON}$. As shown in FIG. 4, the switching control circuit 400 comprises a first RS flip-flop FF1, an AND gate ANDA, an inverting circuit INV, an OR gate ORA and a second RS flip-flop FF2. In detail, the first RS flip-flop FF1 has a set terminal S1, a reset terminal R1 and an output terminal Q1, wherein the reset terminal R1 receives the over current comparison signal $S_{SCP}$, the set terminal S1 receives the switching control signal CTRL, and the first RS flip-flop FF1 is configured to generate a latch signal $S_{FF}$ at the output terminal Q1 based on the over current comparison signal $S_{SCP}$ and the switching control signal CTRL. The AND gate ANDA has a first input terminal, a second input terminal and an output terminal, wherein the first input terminal of the AND gate ANDA receives the latch signal $S_{FF}$, the second input terminal of the AND gate ANDA receives the on signal $S_{ON}$, the AND gate ANDA generates an AND signal $S_{AND}$ by implementing logical conjunction on the latch signal $S_{FF}$ and the on signal $S_{ON}$. The inverting circuit INV has an input terminal and an output terminal, wherein the input terminal of the inverting circuit INV receives the watch-dog signal $S_{WD}$ and the inverting circuit INV inverts the watch-dog signal $S_{WD}$ and generates an inverting signal $S_{WD}'$ of the watch-dog signal $S_{WD}$. The OR gate ORA has a first input terminal, a second input terminal and an output terminal, the first input terminal of the OR gate ORA receives the AND signal $S_{AND}$, the second input terminal of the OR gate ORA receives the inverting signal $S_{WD}'$ of the watch-dog signal $S_{WD}$, the OR gate ORA generates the OR signal $S_{OR}$ at the output terminal by implementing logical disjunction on the AND signal $S_{AND}$ and the inverting signal $S_{WD}'$ of the watch-dog signal $S_{WD}$. The second RS flip-flop FF2 has a set terminal SX, a reset terminal R2 and an output terminal Q2, the reset terminal R2 receives the over current comparison signal $S_{SCP}$, the set terminal SX receives the OR signal $S_{OR}$, the second RS flip-flop FF2 generates the switching control signal CTRL based on the over current comparison signal $S_{SCP}$ and the OR signal $S_{OR}$.

When the over current comparison signal $S_{SCP}$ transits from the non-activated state into the activated state, the second RS flip-flop FF2 is reset which, in turn, causes the switching control signal CTRL from the second RS flip-flop FF2 to transit from the activated state into the non-activated state to turn off the switch S. Meanwhile, such non-activated state of the switching control signal switching control signal CTRL (the activated state of the watch-dog triggering signal $S_{WDT}$) triggers the watch-dog circuit 122 to start timing, thus, the watch-dog signal $S_{WD}$ transits from the non-activated state into the activated state, and the inverting signal $S_{WD}'$ of the watch-dog signal $S_{WD}$ transits from the activated state into the non-activated state accordingly. On the other hand, the activated state of the over current comparison signal $S_{SCP}$ resets the first RS flip-flop FF1 which, in turn, causes the latch signal $S_{FF}$ from the first RS flip-flop FF1 to transit from the activated state into the non-activated state, thus, providing the AND signal $S_{AND}$ from the AND gate ANDA the non-activated state regardless of the state of the on signal Son. That is, the on signal $S_{ON}$ is overrode by the latch signal $S_{FF}$ and stops controlling the turning-on operation of the switch S, in other words, the on moment control circuit 123 is disabled by the activated state of the over current comparison signal $S_{SCP}$. Then, logical conjunction is implemented on the AND signal $S_{AND}$ and the inverting signal $S_{WD}'$ of the watch-dog signal $S_{WD}$, and the OR signal $S_{OR}$ is determined by the inverting signal $S_{WD}'$ of the watch-dog signal $S_{WD}$ due to the non-activated state of the AND signal $S_{AND}$. When the watch-dog circuit 122 is timing, the inverting signal $S_{WD}'$ of the watch-dog signal $S_{WD}$ is in the non-activated state which, in turn, provides the OR signal $S_{OR}$ the non-activated state and the switching control signal CTRL the non-activated state as well, thus, turning off the switch S. When the watch-dog circuit 122 stops timing, the watch-dog signal $S_{WD}$ transits from the activated state into the non-activated state, and consequently, the inverting signal $S_{WD}'$ of the watch-dog signal $S_{WD}$ transits from the non-activated state into the activated state, thus, causing the OR signal $S_{OR}$ to transit from the non-activated state into the activated state, which, in turn, sets the second RS flip-flop FF2 and causes the switching control signal CTRL to transit from the non-activated state into the activated state to turn on the switch S. On one hand, if the over current comparison signal $S_{SCP}$ transits from the non-activated state into the activated state after the switch S is turned on, the switching control circuit 400 repeats the above operation. On the other hand, if no transition from the non-activated state into the activated state for the over current comparison signal $S_{SCP}$ occurs after the switch S is turned on, the transition from the non-activated state into the activated state for the switching control signal CTRL sets the first RS flip-flop FF1, and the latch signal $S_{FF}$ in turn transits from the non-activated state into the activated state. In this way, the AND signal $S_{AND}$ keeps the same as the on signal $S_{ON}$. And as the watch-dog signal $S_{WD}$ is in the non-activated state, the inverting signal $S_{WD}'$ of the watch-dog signal $S_{WD}$ is in the activated state, and the OR signal $S_{OR}$ keeps the same as the AND signal $S_{AND}$ and the on signal $S_{ON}$. As a result, the on signal $S_{ON}$ controls the turning-on operation of the switch S.

When no surge event or over current event occurs, the over current comparison signal $S_{SCP}$ keeps in the non-activated state, and the latch signal $S_{FF}$ maintains in the activated state under the control of the switching control signal CTRL. The AND signal $S_{AND}$ keeps the same as the on signal $S_{ON}$ due to the activated state of the latch signal $S_{FF}$ through the logical conjunction on the latch signal $S_{FF}$ and the on signal $S_{ON}$. When no surge event or over current event occurs, the watch-dog circuit 122 does not time, and the watch-dog signal $S_{WD}$ maintains in the non-activated state and the inverting signal $S_{WD}'$ of the watch-dog signal $S_{WD}$ maintains in the activated state. In this way, the OR signal $S_{OR}$ keeps the same as the on signal $S_{ON}$, and when the on signal $S_{ON}$ transits from the non-activated state into the activated state, the OR signal $S_{OR}$ transits into the activated state as well, thus, setting the second RS flip-flop FF2 to provide the switching control signal CTRL the activated state to turn on the switch S.

Persons of ordinary skill in the art will recognize that, the switching control circuit 400 is just for illustration, in another embodiment, the switching control circuit 124 may have any other appropriate configuration.

Persons of ordinary skill in the art will also recognize that, in the switching mode power supply 100, an off control circuit (not shown) may be further comprised to control the turning-off operation of the switch S, the off control circuit receives a feedback signal representative of the output voltage $V_{OUT}$ and to control the turning-off operation of the switch S based on the feedback signal.

Figure 5:
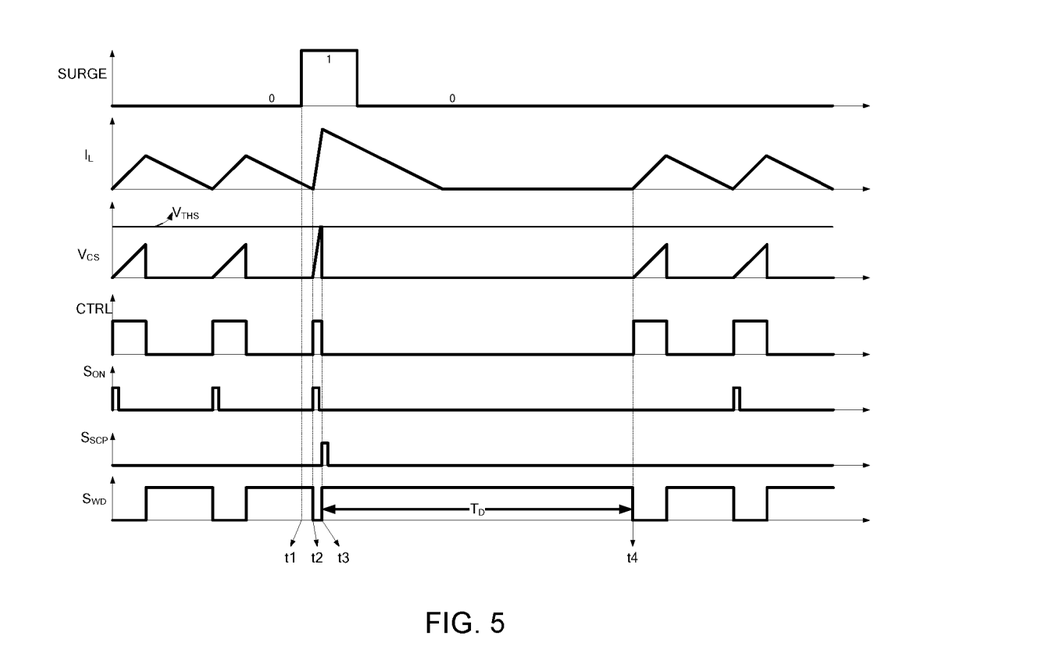
FIG. 5 illustrates the operation of the switching mode power supply 100 during a surge event.

FIG. 5 illustrates the operation of the switching mode power supply 100 during a surge event. From up and down, FIG. 5 illustrates a surge, the inductor current $I_L$, the first current detecting signal $V_{CS}$, the switching control signal CTRL, the on signal $S_{ON}$, the over current comparison signal $S_{SCP}$ and the watch-dog signal $S_{WD}$. As shown in FIG. 5, before moment t1, the switching mode power supply 100 operates normally and the switch S is turned on and off periodically to convert the input voltage $V_{IN}$ into the output voltage $V_{OUT}$. The switching mode power supply 100 turns on the switch S based on the on signal $S_{ON}$, and in detail, when the on signal $S_{ON}$ transits from the non-activated state into the activated state, the switching control signal CTRL transits into the activated state to turn on the switch S, as a result of which, the inductor current $I_L$ increases gradually; when the output voltage $V_{OUT}$ satisfies an off condition, the switching control signal CTRL transits into the non-activated state to turn off the switch S, as a result of which, inductor current $I_L$ decreases gradually. During this process, the first current detecting signal $V_{CS}$ is lower than the over current threshold signal $V_{THS}$, the over current comparison signal $S_{SCP}$ is thus in the non-activated state. The watch-dog circuit 122 starts timing when the switch S is turned off, and the watch-dog signal $S_{WD}$ transits from the non-activated state into the activated state. The watch-dog signal $S_{WD}$ transits from the activated state back into the non-activated state when the switch S is turned on by the on signal Son. As can be seen from the above description, the duration of the timing during the normal operation is lower than the preset period of time $T_D$, thus, the watch-dog signal $S_{WD}$ does not control the turning-on operation of the switch S.

At moment t1, a surge event occurs in the switching mode power supply 100 (in FIG. 5, the activated state "1" represents a surge event, while the non-activated state "0" represents no surge event). Thus, when the switch S is turned on at moment t2, the inductor current $I_L$ goes up dramatically which results in a dramatical increase in the first current detecting signal $V_{CS}$, and at moment t3, the first current detecting signal $V_{CS}$ reaches the over current threshold signal $V_{THS}$, as a result of which, the over current comparison signal $S_{SCP}$ transits from the non-activated state into the activated state to turn off the switch S, and the switching control signal CTRL transits from the activated state into the non-activated state. Such the activated state of the over current comparison signal $S_{SCP}$ disables the on moment control circuit 123 which thus stops controlling the turning-on operation of the switch S. Upon the non-activated state of the switching control signal CTRL, the watch-dog signal $S_{WD}$ transits from the non-activated state into the activated state. And as the on moment control circuit 123 stops controlling the turning-on operation of the switch S, the watch-dog signal $S_{WD}$ keeps the activated state until moment t4 when the preset period of time $T_D$ expires. At moment t4, the watch-dog signal $S_{WD}$ transits from the activated state into the non-activated state to turn on the switch S, and as a result of which, the switching control signal CTRL transits into the activated state. As the surge event ends before moment t4, thus, the inductor current $I_L$ increases gradually and will not reach the over current threshold signal $V_{THS}$, the switching mode power supply 100 operates normally and the switch S is turned on and off periodically then.

Figure 6:
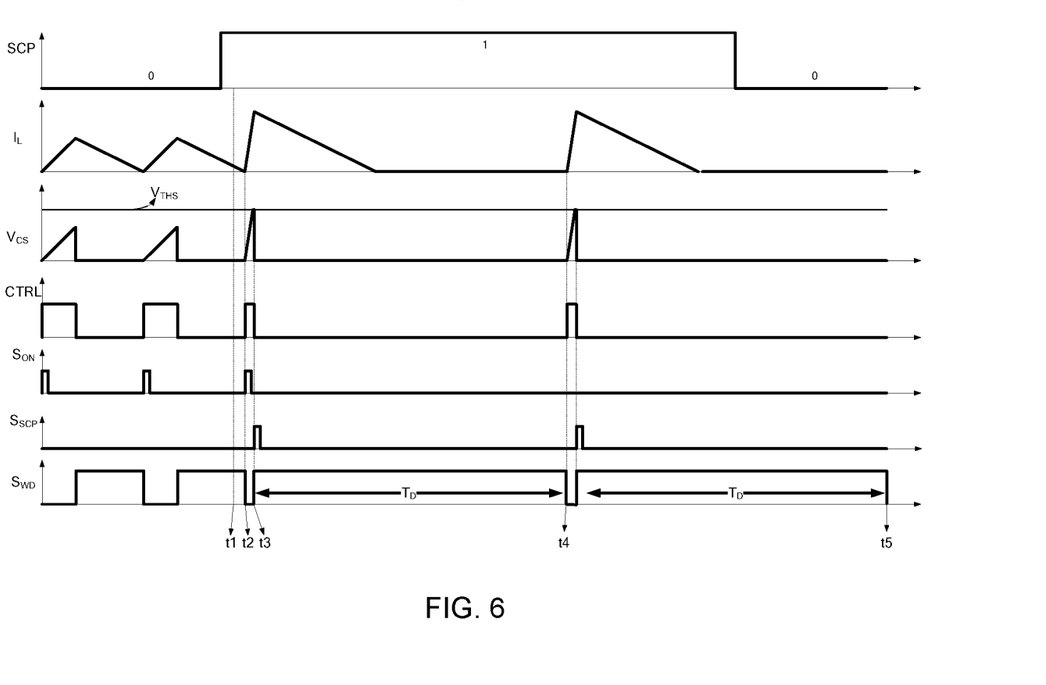
FIG. 6 illustrates the operation of the switching mode power supply 100 during an over current event.

FIG. 6 illustrates the operation of the switching mode power supply 100 during an over current event. In FIG. 6, the activated state "1" represents the over current event, and the non-activated state "0" represents no over current event. As shown in FIG. 6, before moment t4, the operation of the switching mode power supply 100 during the over current event is similar to the operation of the switching mode power supply 100 during the surge event. At moment t4, the watch-dog signal $S_{WD}$ transits from the activated state into the non-activated state to turn on the switch S, and as a result of which, the switching control signal CTRL transits into the activated state. As the over current event still exits at moment t4, again, the inductor current $I_L$ as well as the first current detecting signal $V_{CS}$ goes up dramatically, and the first current detecting signal $V_{CS}$ reaches the over current threshold signal $V_{THS}$, as a result of which, the over current comparison signal $S_{SCP}$ transits from the non-activated state into the activated state to turn off the switch S, and the switching control signal CTRL transits from the activated state into the non-activated state. Such the activated state of the over current comparison signal $S_{SCP}$ disables the on moment control circuit 123 which thus stops controlling the turning-on operation of the switch S. Upon the non-activated state of the switching control signal CTRL, the watch-dog signal $S_{WD}$ transits from the non-activated state into the activated state. And as the on moment control circuit 123 stops controlling the turning-on operation of the switch S, the watch-dog signal $S_{WD}$ keeps the activated state until moment t4 when the preset period of time $T_D$ expires.

As can be seen from the above description, with the present invention, the switching mode power supply can effectively distinguish a surge event and an over current event and take different actions accordingly. During the surge event, the switching mode power supply is shut down for a preset period of time, and after the expiration of the preset period of time, the switch is turned on and the switching mode power supply operates normally as the surge event ends already. During the over current event, the switching mode power supply is shut down for a preset period of time, and after the expiration of the preset period of time, the switch is turned on, however, as the over current event still exists, the above operation repeats to provide an effective over current protection to prevent the switching mode power supply from a damage.

Figure 7:
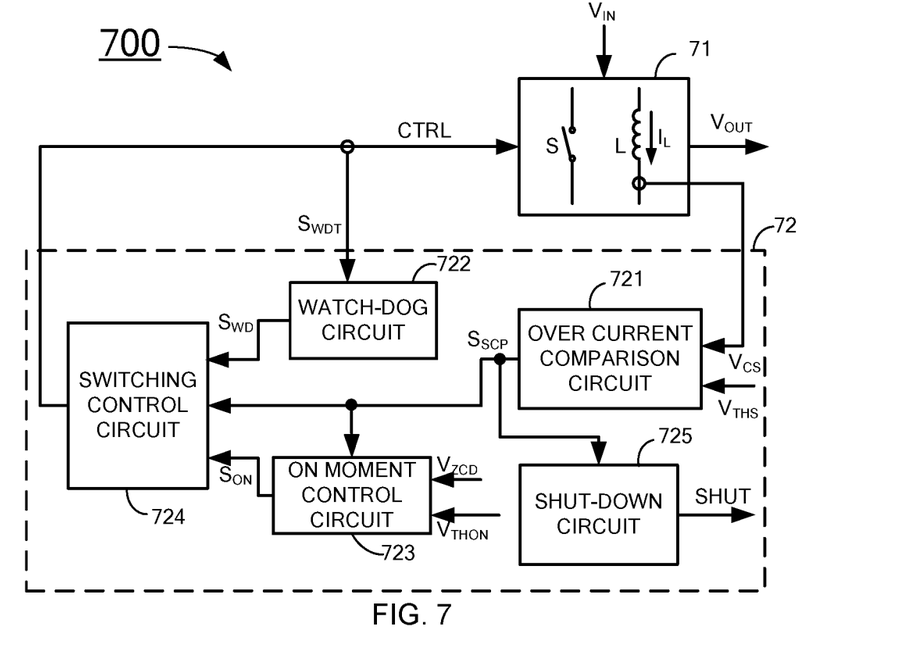
FIG. 7 schematically illustrates a switching mode power supply 700 in accordance with an embodiment of the present invention.

FIG. 7 schematically illustrates a switching mode power supply 700 in accordance with an embodiment of the present invention. As shown in FIG. 7, the switching mode power supply 700 has a similar configuration as that of the switching mode power supply 100 except that the switching mode power supply 700 further comprises a timing circuit 725. The timing circuit 725 is coupled to the over current comparison circuit 721 and is configured to generate a shut-down signal SHUT based on the over current comparison signal $S_{SCP}$ so as to shut down the entire switching mode power supply 700 when the over current event lasts for M consecutive switching cycles, wherein a switching cycle is the time duration between a moment when the switch S is turned on and the next successive moment when the switch S is turned on, and wherein M is an integer larger than 2. In an embodiment, if the over current comparison signal $S_{SCP}$ maintains in the activated state for M consecutive switching cycles, the shut-down signal SHUT transits from a non-activated state (e.g., logic "0") into an activated state (e.g., logic "1") to shut down the entire switching mode power supply 700. Persons of ordinary skill in the art will understand that, there are a variety of ways to shut down the entire switching mode power supply 700 and they are not elaborated herein for simplicity. In an embodiment, the timing circuit 725 further receives the switching control signal CTRL, the timing circuit 725 adds 1 when both the switching control signal CTRL and the over current comparison signal $S_{SCP}$ are in their activated states, and similarly, in the next switching cycle, the timing circuit 725 adds 1 again when both the switching control signal CTRL and the over current comparison signal $S_{SCP}$ are still in their activated states. On the contrary, the timing circuit 725 is reset and the timing is cleared when the over current comparison signal $S_{SCP}$ is in the non-activated state. In this way, when the timing circuit 725 adds to M, it is indicated that the activated state of the over current comparison signal $S_{SCP}$ lasts for M consecutive switching cycles, and the shut-down signal SHUT transits from the non-activated state into the activated state to shut down the entire switching mode power supply 700.

With the driving circuit and the switching mode power supply of FIG. 7, when an over current event occurs, the switching mode power supply can be shut down to provide a better protection to prevent the switching mode power supply from a damage due to the over current event.

Figure 8:
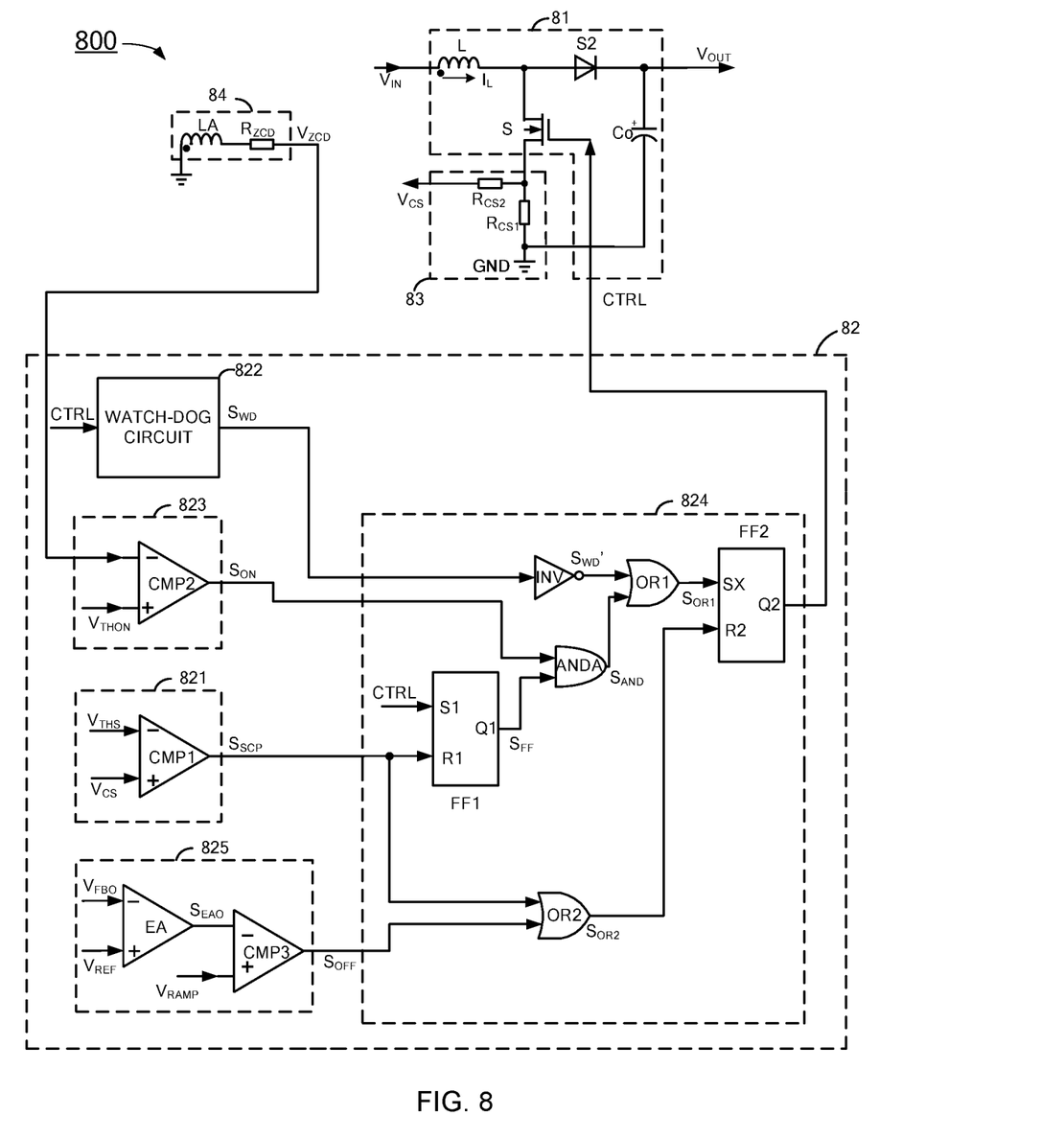
FIG. 8 schematically illustrates a switching mode power supply 800 in accordance with an embodiment of the present invention.

FIG. 8 schematically illustrates a switching mode power supply 800 in accordance with an embodiment of the present invention. As shown in FIG. 8, the switching mode power supply 800 comprises a switching circuit 81. The switching circuit 81 comprises an inductor L, a switch S, a second switch S2 and an output capacitor Co. The inductor L has a first terminal and a second terminal, wherein the first terminal of the inductor L receives an input voltage $V_{IN}$. The switch S has a first terminal, a second terminal and a control terminal, wherein the first terminal of the switch S is coupled to the second terminal of the inductor L, and the control terminal is controlled by a switching control signal CTRL to turn the switch S on and off. The second switch S2 has a first terminal and a second terminal, wherein the first terminal is coupled to the second terminal of the inductor L. The output capacitor Co has a first terminal and a second terminal, wherein the first terminal is coupled to the second terminal of the second switch second switch S2 and is configured to provide an output voltage $V_{OUT}$, and the second terminal is coupled to a reference ground GND. In the embodiment of FIG. 8, the second switch S2 is implemented with a diode, an anode of the diode is configured as the first terminal of the second switch S2, and a cathode of the diode is configured as the second terminal of the second switch S2.

The switching mode power supply 800 is further configured to comprise a current detecting circuit 83 comprising a first detecting resistor $R_{CS1}$ and a second detecting resistor $R_{CS2}$, wherein the first detecting resistor $R_{CS1}$ has a first terminal and a second terminal, the first terminal of the first detecting resistor $R_{CS1}$ is coupled to the second terminal of the switch S, the second terminal of the first detecting resistor $R_{CS1}$ is coupled to the reference ground GND. The second detecting resistor $R_{CS2}$ has a first terminal and a second terminal, the first terminal of the second detecting resistor $R_{CS2}$ is coupled to the first terminal of the first detecting resistor $R_{CS1}$, the second terminal of the second detecting resistor $R_{CS2}$ is configured to provide a first current detecting signal $V_{CS}$.

The switching mode power supply 800 is further configured to comprise a zero-crossing detecting circuit 84 comprising an auxiliary inductor LA and a zero-crossing detecting resistor $R_{ZCD}$. The auxiliary inductor LA is coupled to the inductor L and forms a transformer together with the inductor L. The auxiliary inductor LA has a first terminal and a second terminal, wherein the first terminal is coupled to the reference ground GND. The zero-crossing detecting resistor $R_{ZCD}$ has a first terminal and a second terminal, the first terminal of the zero-crossing detecting resistor $R_{ZCD}$ is coupled to the second terminal of the auxiliary inductor LA, and the second terminal of the zero-crossing detecting resistor $R_{ZCD}$ is configured to provide a second current detecting signal $V_{ZCD}$.

The switching mode power supply 800 is further configured to comprise a driving circuit 82. The driving circuit 82 comprises an over current comparison circuit 821, a watch-dog circuit 822, an on moment control circuit 823 and a switching control circuit 824. The over current comparison circuit 821 comprises an over current comparator CMP1 having a first input terminal, a second input terminal and an output terminal, wherein the first input terminal of the over current comparator CMP1 receives an over current threshold signal $V_{THS}$, the second input terminal of the over current comparator CMP1 receives the first current detecting signal $V_{CS}$, the over current comparator CMP1 is configured to generate an over current comparison signal $S_{SCP}$ based on comparing the over current threshold signal $V_{THS}$ with the first current detecting signal $V_{CS}$. In an embodiment, the first input terminal of the over current comparator CMP1 is an inverting input terminal and the second input terminal of the over current comparator CMP1 is a non-inverting input terminal. In this way, the over current comparison signal $S_{SCP}$ transits from the non-activated state (logic low "0") into the activated state (logic high "1") when the first current detecting signal $V_{CS}$ is larger than the over current threshold signal $V_{THS}$.

The watch-dog circuit 822 receives the switching control signal CTRL, and when the switching control signal CTRL transits from a non-activated state (e.g., logic "0") into an activated state (e.g., logic "1"), the watch-dog circuit 822 starts timing and the watch-dog signal $S_{WD}$ transits from a non-activated state (e.g., logic "0") into an activated state (e.g., logic "1"). After the preset period of time $T_D$ expires, the watch-dog circuit 122 stops timing and the watch-dog signal $S_{WD}$ transits from the activated state into the non-activated state to trigger a turning-on operation of the switch S. When the switch S is turned on, the switching control signal CTRL transits from the non-activated state into the activated state to reset the watch-dog signal $S_{WD}$.

In an embodiment, the switching mode power supply 800 has a normal switching cycle when the switching mode power supply 800 is in a normal operation where no transition from the non-activated state into the activated state of the over current comparison signal $S_{SCP}$ occurs, then the preset period of time $T_D$ is larger than the normal switching cycle, for example, the preset period of time $T_D$ is approximately ten times of the normal switching cycle. Yet in another embodiment, the preset period of time $T_D$ can be appropriately set, considering the time duration when a surge pulse lasts and the time duration when an over current event lasts, so as to distinguish the surge event and the over current event to ensure the surge event ends by the end of the preset period of time $T_D$.

The on moment control circuit 823 comprises an on comparator CMP2 having a first input terminal, a second input terminal and an output terminal, wherein the first input terminal of the on comparator CMP2 receives an on threshold signal $V_{THON}$, the second input terminal of the on comparator CMP2 receives the second current detecting signal $V_{ZCD}$, the on comparator CMP2 is configured to generate the on signal $S_{ON}$ based on comparing the on threshold signal $V_{THON}$ with the second current detecting signal $V_{ZCD}$. In an embodiment, the first input terminal of the on comparator CMP2 is a non-inverting input terminal and the second input terminal is an inverting input terminal. In this way, the on signal $S_{ON}$ transits from the non-activated state (logic low "0") into the activated state (logic high "1") to turn the switch S on when the second current detecting signal $V_{ZCD}$ is lower than the on threshold signal $V_{THON}$.

In addition, the driving circuit 82 may be further configured to comprise an off moment control circuit 825. The off moment control circuit 825 receives a feedback signal $V_{FBO}$ representative of the output voltage $V_{OUT}$ and generates an off signal $S_{OFF}$ based on the feedback signal $V_{FBO}$ to control a turning-off moment of the switch S. In detail, as shown in FIG. 8, the off moment control circuit 825 comprises an error amplifier EA and an off comparator CMP3. The error amplifier EA has a first input terminal, a second input terminal and an output terminal, wherein the first input terminal receives the feedback signal $V_{FBO}$, the second input terminal receives the a reference signal $V_{REF}$, the error amplifier EA generates an error amplifying signal $V_{EAO}$ at the output terminal based on amplifying the difference between the reference signal $V_{REF}$ and the feedback signal $V_{FBO}$. The off comparator CMP3 has a first input terminal, a second input terminal and an output terminal, wherein the first input terminal of the off comparator CMP3 is coupled to the output terminal of the error amplifier EA to receive the error amplifying signal $V_{EAO}$, the second input terminal of the off comparator CMP3 receives a ramp signal $V_{RAMP}$ representative of the instantaneous value of the input voltage $V_{IN}$, and the off comparator CMP3 generates the off signal $S_{OFF}$ based on comparing the error amplifying signal $V_{EAO}$ with the ramp signal $V_{RAMP}$ to control the turning-off moment of the switch S. In an embodiment, the first input terminal of the error amplifier EA is an inverting input terminal, and the second input terminal of the error amplifier EA is a non-inverting input terminal, the first input terminal of the off comparator CMP3 is an inverting input terminal and the second input terminal of the off comparator CMP3 is a non-inverting input terminal.

The switching control circuit 824 comprises a first RS flip-flop FF1, an AND gate ANDA, an inverting circuit INV, a first OR gate OR1, a second OR gate OR2 and a second RS flip-flop FF2. In detail, the first RS flip-flop FF1 has a set terminal S1, a reset terminal R1 and an output terminal Q1, wherein the reset terminal R1 receives the over current comparison signal $S_{SCP}$, the set terminal S1 receives the switching control signal CTRL, and the first RS flip-flop FF1 is configured to generate a latch signal $S_{FF}$ at the output terminal Q1 based on the over current comparison signal $S_{SCP}$ and the switching control signal CTRL. The AND gate ANDA has a first input terminal, a second input terminal and an output terminal, wherein the first input terminal of the AND gate ANDA receives the latch signal $S_{FF}$, the second input terminal of the AND gate ANDA receives the on signal $S_{ON}$, the AND gate ANDA generates an AND signal $S_{AND}$ by implementing logical conjunction on the latch signal $S_{FF}$ and the on signal $S_{ON}$. The inverting circuit INV has an input terminal and an output terminal, wherein the input terminal of the inverting circuit INV receives the watch-dog signal $S_{WD}$ and the inverting circuit INV inverts the watch-dog signal $S_{WD}$ and generates an inverting signal $S_{WD}'$ of the watch-dog signal $S_{WD}$. The first OR gate OR1 has a first input terminal, a second input terminal and an output terminal, the first input terminal of the first OR gate OR1 receives the AND signal $S_{AND}$, the second input terminal of the first OR gate OR1 receives the inverting signal $S_{WD}'$ of the watch-dog signal $S_{WD}$, the first OR gate OR1 generates a first OR signal $S_{OR1}$ at the output terminal by implementing logical disjunction on the AND signal $S_{AND}$ and the inverting signal $S_{WD}'$ of the watch-dog signal $S_{WD}$. The second OR gate OR2 has a first input terminal, a second input terminal and an output terminal, the first input terminal of the second OR gate OR2 receives the over current comparison signal $S_{SCP}$, the second input terminal of the second OR gate OR2 receives the off signal $S_{OFF}$, the second OR gate OR2 generates a second OR signal $S_{OR2}$ at the output terminal by implementing logical disjunction on the over current comparison signal $S_{SCP}$ and the off signal $S_{OFF}$. The second RS flip-flop FF2 has a set terminal SX, a reset terminal R2 and an output terminal Q2, the reset terminal R2 receives the second OR signal $S_{OR2}$, the set terminal SX receives the first OR signal $S_{OR1}$, the second RS flip-flop FF2 generates the switching control signal CTRL based on the first OR signal $S_{OR1}$ and the second OR signal $S_{OR2}$.

Next, the operation of the switching mode power supply 800 in FIG. 8 during a surge event and an over current event will be elaborated with reference to FIG. 5 and FIG. 6. As shown in FIG. 5 and FIG. 6, before moment t1, the switching mode power supply 800 operates normally and the switch S is turned on and off periodically to convert the input voltage $V_{IN}$ into the output voltage $V_{OUT}$. The switching mode power supply 800 turns on the switch S based on the on signal $S_{ON}$, and in detail, when the on signal $S_{ON}$ transits from the non-activated state into the activated state, the switching control signal CTRL transits into the activated state to turn on the switch S, as a result of which, the inductor current $I_L$ increases gradually; the switching mode power supply 800 turns off the switch S based on the off signal $S_{OFF}$, and in detail, when the off signal $S_{OFF}$ transits from the non-activated state into the activated state, the switching control signal CTRL transits into the non-activated state to turn off the switch S, as a result of which, the inductor current $I_L$ decreases gradually. During this process, the first current detecting signal $V_{CS}$ is lower than the over current threshold signal $V_{THS}$, the over current comparison signal $S_{SCP}$ is thus in the non-activated state. The watch-dog circuit 122 starts timing when the switching control signal CTRL transits into the non-activated state, and the watch-dog signal $S_{WD}$ transits from the non-activated state into the activated state. The watch-dog signal $S_{WD}$ transits from the activated state back into the non-activated state when the switching control signal CTRL transits into the activated state. As can be seen from the above description, the watch-dog signal $S_{WD}$ does not control the turning-on operation of the switch S when the switching mode power supply 800 is in the normal operation.

As shown in FIG. 5, when a surge event occurs, the first current detecting signal $V_{CS}$ is larger than the over current threshold signal $V_{THS}$, and the over current comparison signal $S_{SCP}$ transits from the non-activated state into the activated state, the second OR signal SOR2 transits from the non-activated state into the activated state, thus, resetting the second RS flip-flop FF2 which, in turn, causes the switching control signal CTRL from the second RS flip-flop FF2 to transit from the activated state into the non-activated state to turn off the switch S. Meanwhile, such non-activated state of the switching control signal CTRL triggers the watch-dog circuit 822 to start timing, thus, the watch-dog signal $S_{WD}$ transits from the non-activated state into the activated state, and the inverting signal $S_{WD}'$ of the watch-dog signal $S_{WD}$ transits from the activated state into the non-activated state accordingly. On the other hand, the activated state of the over current comparison signal $S_{SCP}$ resets the first RS flip-flop FF1 which, in turn, causes the latch signal $S_{FF}$ from the first RS flip-flop FF1 to transit from the activated state into the non-activated state, thus, providing the AND signal $S_{AND}$ from the AND gate ANDA the non-activated state regardless of the state of the on signal Son. That is, the on signal $S_{ON}$ is overrode by the latch signal $S_{FF}$ and stops controlling the turning-on operation of the switch S, in other words, the on moment control circuit 823 is disabled by the activated state of the over current comparison signal $S_{SCP}$. Then, logical conjunction is implemented on the AND signal $S_{AND}$ and the inverting signal $S_{WD}'$ of the watch-dog signal $S_{WD}$, and the first OR signal $S_{OR1}$ is determined by the inverting signal $S_{WD}'$ of the watch-dog signal $S_{WD}$ due to the non-activated state of the AND signal $S_{AND}$. When the watch-dog circuit 822 is timing, the inverting signal $S_{WD}'$ of the watch-dog signal $S_{WD}$ is in the non-activated state which, in turn, provides the first OR signal $S_{OR1}$ the non-activated state and the switching control signal CTRL the non-activated state as well, thus, turning off the switch S. When the watch-dog circuit 122 stops timing, the watch-dog signal $S_{WD}$ transits from the activated state into the non-activated state, and consequently, the inverting signal $S_{WD}'$ of the watch-dog signal $S_{WD}$ transits from the non-activated state into the activated state, thus, causing the OR signal $S_{OR}$ to transit from the non-activated state into the activated state, which, in turn, sets the second RS flip-flop FF2 and causes the switching control signal CTRL to transit from the non-activated state into the activated state to turn on the switch S. When the switching control signal CTRL transits from the non-activated state into the activated state, the first RS flip-flop FF1 is set, and the latch signal $S_{FF}$ in turn transits from the non-activated state into the activated state. In this way, the AND signal $S_{AND}$ keeps the same as the on signal $S_{ON}$. And when the switching control signal CTRL transits from the non-activated state into the activated state, the inverting signal $S_{WD}'$ of the watch-dog signal $S_{WD}$ transits from the non-activated state into the activated state, and the OR signal $S_{OR}$ keeps the same as the AND signal $S_{AND}$ and the on signal $S_{ON}$. As a result, the on signal $S_{ON}$ controls the turning-on operation of the switch S. After the switch S is turned on, if the first current detecting signal $V_{CS}$ is still larger than the over current threshold signal $V_{THS}$, the over current comparison signal $S_{SCP}$ transits from the non-activated state into the activated state again, and the switching mode power supply 800 repeats the above operation.

As can be seen from the above description, with the present invention, the switching mode power supply can effectively distinguish a surge event and an over current event and take different actions accordingly. During the surge event, the switching mode power supply is shut down for a preset period of time, and after the expiration of the preset period of time, the switch is turned on and the switching mode power supply operates normally as the surge event ends already. During the over current event, the switching mode power supply is shut down for a preset period of time, and after the expiration of the preset period of time, the switch is turned on, however, as the over current event still exists, the above operation repeats to provide an effective over current protection to prevent the switching mode power supply from a damage.

Figure 9:
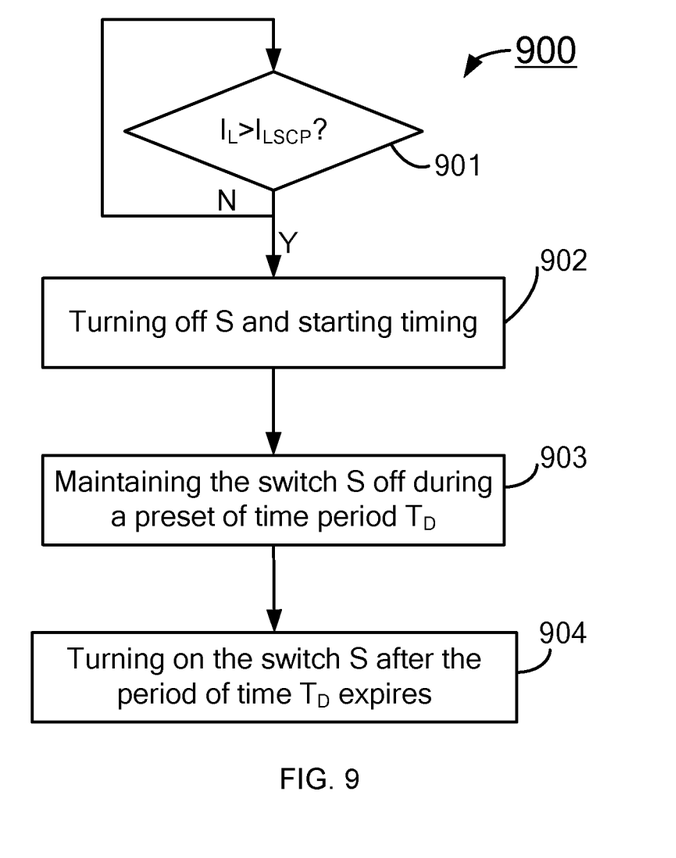
FIG. 9 illustrates a driving method 900 for driving a switching mode power supply in accordance with an embodiment of the present invention.

FIG. 9 illustrates a driving method 900 for driving a switching mode power supply in accordance with an embodiment of the present invention. The switching mode power supply comprises a switch S and an inductor L, wherein the inductor current $I_L$ flows through the inductor L. As shown in FIG. 9, the driving method 900 comprises steps 901-904. In step 901, it is performed to detect whether the inductor current $I_L$ is larger than a preset value $I_{LSCP}$, and if the inductor current $I_L$ is not larger than the preset value $I_{LSCP}$, the detection continues, otherwise, if the inductor current $I_L$ is larger than the preset value $I_{LSCP}$, the driving method 900 goes to step 902. In step 902, the switch S is turned off and the switching mode power supply starts timing. Then the driving method 900 goes to step 903 in which the switch S keeps off during the preset period of time $T_D$. In step 904, the switch S is turned on after the preset period of time $T_D$ expires. In an embodiment, the switching mode power supply has a normal switching cycle when the switching mode power supply operates in a normal operation where the inductor current $I_L$ is not larger than the preset value $I_{LSCP}$, then the preset period of time $T_D$ is larger than the normal switching cycle, for example, the preset period of time $T_D$ is approximately ten times of the normal switching cycle. Yet in another embodiment, the entire switching mode power supply is shut down when the inductor current $I_L$ is larger than the preset value $I_{LSCP}$ for M consecutive switching cycles, wherein a switching cycle is the time duration between a moment when the switch S is turned on and the next successive moment when the switch S is turned on, and wherein M is an integer larger than 2.

With the present invention, the switching mode power supply can effectively distinguish a surge event and an over current event and take different actions accordingly. During the surge event, the switching mode power supply is shut down for a preset period of time, and after the expiration of the preset period of time, the switch is turned on and the switching mode power supply operates normally as the surge event ends already. During the over current event, the switching mode power supply is shut down for a preset period of time, and after the expiration of the preset period of time, the switch is turned on, however, as the over current event still exists, the above operation repeats to provide an effective over current protection to prevent the switching mode power supply from a damage.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

What is claimed is:

1. A driving circuit in a switching mode power supply, wherein the switching mode power supply comprises an inductor and a switch, and wherein an inductor current flows through the inductor, the driving circuit comprising:
    an over current comparison circuit configured to receive an over current threshold signal and a first current detecting signal representative of the inductor current generated during a period when the switch is on, wherein the over current comparison circuit is configured to generate an over current comparison signal to control a turning-off moment of the switch based on comparing the first current detecting signal with the over current threshold signal;
    a watch-dog circuit configured to receive a watch-dog triggering signal indicating the turning-off moment of the switch, wherein the watch-dog circuit is configured to generate a watch-dog signal based on the watch-dog triggering signal to trigger a turning-on operation of the switch after a preset period of time expires, and wherein the preset period of time is timed beginning from the turning-off moment of the switch;
    an on moment control circuit configured to receive a second current detecting signal representative of the inductor current generated during a period when the switch is off and to receive an on threshold signal, wherein the on moment control circuit is configured to generate an on signal to control a turning-on moment of the switch based on comparing the second current detecting signal with the on threshold signal, and wherein the on moment control circuit is enabled or disable by the over current comparison signal; and
    a switching control circuit configured to generate a switching control signal based on the over current comparison signal, the watch-dog signal and the on signal to control the turning-on moment and the turning-off moment of the switch.

2. The driving circuit of claim 1, wherein the watch-dog triggering signal is the switching control signal.

3. The driving circuit of claim 1, wherein the switching control circuit comprises:
    a first RS flip-flop having a set terminal, a reset terminal and an output terminal, wherein the set terminal receives the switching control signal, the reset terminal receives the over current comparison signal, and the first RS flip-flop provides a latch signal at the output terminal;
    an AND gate having a first input terminal, a second input terminal and an output terminal, the first input terminal receives the latch signal, the second input terminal receives the on signal, the AND gate generates an AND signal at the output terminal based on the latch signal and the on signal;
    an inverting circuit having an input terminal and an output terminal, wherein the inverting circuit receives the watch-dog signal at the input terminal and inverts the watch-dog signal to generate an inverting signal of the watch-dog signal at the output terminal;
    an OR gate having a first input terminal, a second input terminal and an output terminal, wherein the OR gate receives the AND signal at the first input terminal and the inverting signal of the watch-dog signal at the second input terminal, and the AND gate generates an OR signal at the output terminal based on the AND signal and the inverting signal of the watch-dog signal; and
    a second RS flip-flop having a set terminal, a reset terminal and an output terminal, wherein the second RS flip-flop receives the over current comparison signal at the reset terminal and the OR signal at the set terminal, and the second RS flip-flop generates the switching control signal based on the over current comparison signal and the OR signal.

4. The driving circuit of claim 1, wherein the driving circuit comprises an off moment control circuit configured to receive a feedback signal representative of an output voltage of the switching mode power supply and to receive an off threshold signal, and the off moment control circuit is configured to generate an off signal based on the feedback signal and the off threshold signal to control a turning-off operation of the switch.

5. The driving circuit of claim 4, wherein the switching control circuit comprises:
    a first RS flip-flop having a set terminal, a reset terminal and an output terminal, wherein the set terminal receives the switching control signal, the reset terminal receives the over current comparison signal, and the first RS flip-flop is configured to provide a latch signal at the output terminal;

an AND gate having a first input terminal, a second input terminal and an output terminal, the first input terminal receives the latch signal, the second input terminal receives the on signal, and the AND gate generates an AND signal at the output terminal based on the latch signal and the on signal;

an inverting circuit having an input terminal and an output terminal, wherein the inverting circuit receives the watch-dog signal at the input terminal and inverts the watch-dog signal to generate an inverting signal of the watch-dog signal at the output terminal;

a first OR gate having a first input terminal, a second input terminal and an output terminal, wherein the first OR gate receives the AND signal at the first input terminal and the inverting signal of the watch-dog signal at the second input terminal, and the first OR gate generates a first OR signal at the output terminal based on the AND signal and the inverting signal of the watch-dog signal;

a second OR gate having a first input terminal, a second input terminal and an output terminal, wherein the second OR gate receives the over current comparison signal at the first input terminal and the off signal at the second input terminal, and the second OR gate generates a second OR signal at the output terminal based on the over current comparison signal and the off signal; and a second RS flip-flop having a set terminal, a reset terminal and an output terminal, wherein the second RS flip-flop receives the second OR signal at the reset terminal and the first OR signal at the set terminal, and the second RS flip-flop generates the switching control signal based on the first OR signal and the second OR signal.

6. The driving circuit of claim 1, wherein the driving circuit further comprises a timing circuit coupled to the over current comparison circuit, and the timing circuit is configured to generate a shut-down signal to control a shutting-down operation of the switching mode power supply.

7. The driving circuit of claim 6, wherein if an activated state of the over current comparison signal exists during M consecutive switching cycles, the shut-down signal transits from a non-activated state into an activated state to shut down the switching mode power supply, and wherein M is an integer larger than 2.

8. The driving circuit of claim 1, wherein the switching mode power supply further comprises a current detecting circuit, and wherein the current detecting circuit comprises:
a first detecting resistor having a first terminal and a second terminal, wherein the first terminal is coupled to the switch, and the second terminal is coupled to a reference ground; and
a second detecting resistor having a first terminal and a second terminal, wherein the first terminal of the second detecting resistor is coupled to the first terminal of the first detecting resistor, and the second terminal of the second detecting resistor is configured to provide the first current detecting signal.

9. The driving circuit of claim 1, wherein the switching mode power supply further comprises a zero-crossing detecting circuit comprising:
an auxiliary inductor having a first terminal and a second terminal, wherein the first terminal of the auxiliary inductor is coupled to a reference ground, and the auxiliary inductor and the inductor couple together to form a transformer; and a zero-crossing detecting resistor having a first terminal and a second terminal, wherein the first terminal of the zero-crossing detecting resistor is coupled to the second terminal of the auxiliary inductor, and the second terminal of the zero-crossing detecting resistor is configured to provide the second current detecting signal.

10. The driving circuit of claim 1, wherein the over current comparison signal transits from a non-activated state into an activated state when the first current detecting signal is larger than the over current threshold signal, and upon the activated state of the over current comparison signal, the on moment control circuit is disabled, and the switching control circuit turns off the switch and the watch-dog triggering signal transits from a non-activated state into an activated state, and upon the activated state of the watch-dog triggering signal, the watch-dog circuit starts timing and the watch-dog signal transits from a non-activated state into an activated state, and wherein after the preset period of time expires, the watch-dog circuit stops timing and the watch-dog signal transits from the activated state into the non-activated state, and upon the non-activated state of the watch-dog signal, the switching control circuit turns on the switch.

11. A switching mode power supply, comprising:
an inductor, wherein an inductor current flows through the inductor;
a switch; and
a driving circuit, comprising:
an over current comparison circuit configured to receive an over current threshold signal and a first current detecting signal representative of the inductor current generated during a period when the switch is on, wherein the over current comparison circuit is configured to generate an over current comparison signal to control a turning-off moment of the switch based on comparing the first current detecting signal with the over current threshold signal;
a watch-dog circuit configured to receive a watch-dog triggering signal indicating the turning-off moment of the switch, wherein the watch-dog circuit is configured to generate a watch-dog signal based on the watch-dog triggering signal to trigger a turning-on operation of the switch after a preset period of time expires, and wherein the preset period of time is timed beginning from the turning-off moment of the switch;
an on moment control circuit configured to receive a second current detecting signal representative of the inductor current generated during a period when the switch is off and to receive an on threshold signal, wherein the on moment control circuit is configured to generate an on signal to control a turning-on moment of the switch based on comparing the second current detecting signal with the on threshold signal, and wherein the on moment control circuit is enabled or disable by the over current comparison signal; and
a switching control circuit configured to generate a switching control signal based on the over current comparison signal, the watch-dog signal and the on signal to control the turning-on moment and the turning-off moment of the switch.

12. The switching mode power supply of claim 11, wherein the watch-dog triggering signal is the switching control signal.

13. The switching mode power supply of claim 11, wherein the driving circuit comprises an off moment control circuit configured to receive a feedback signal representative of an output voltage of the switching mode power supply and to receive an off threshold signal, and the off moment control circuit is configured to generate an off signal based on the feedback signal and the off threshold signal to control a turning-off operation of the switch.

14. The switching mode power supply of claim 11, wherein the driving circuit further comprises a timing circuit coupled to the over current comparison circuit, and the timing circuit is configured to generate a shut-down signal to control a shutting-down operation of the switching mode power supply.

15. The switching mode power supply of claim 14, wherein if an activated state of the over current comparison signal exists during M consecutive switching cycles, the shut-down signal transits from a non-activated state into an activated state to shut down the switching mode power supply, wherein M is an integer larger than 2.

16. The switching mode power supply of claim 11, wherein the switching mode power supply further comprises a current detecting circuit, and wherein the current detecting circuit comprises:

a first detecting resistor having a first terminal and a second terminal, wherein the first terminal is coupled to the switch, and the second terminal is coupled to a reference ground; and a second detecting resistor having a first terminal and a second terminal, wherein the first terminal of the second detecting resistor is coupled to the first terminal of the first detecting resistor, and the second terminal of the second detecting resistor is configured to provide the first current detecting signal.

17. The switching mode power supply of claim 11, wherein the switching mode power supply further comprises a zero-crossing detecting circuit comprising:

an auxiliary inductor having a first terminal and a second terminal, wherein the first terminal of the auxiliary inductor is coupled to a reference ground, and the auxiliary inductor and the inductor couple together to form a transformer; and a zero-crossing detecting resistor having a first terminal and a second terminal, wherein the first terminal of the zero-crossing detecting resistor is coupled to the second terminal of the auxiliary inductor, and the second terminal of the zero-crossing detecting resistor is configured to provide the second current detecting signal.

\* \* \* \* \*